United States Patent

[11] 3,612,228

| [72] | Inventor | Frank G. Rick<br>174 Gilfillan St., Franklin, Pa. 16323 |
|---|---|---|
| [21] | Appl. No. | 846,764 |
| [22] | Filed | Aug. 1, 1968 |
| [45] | Patented | Oct. 12, 1971 |

[54] HYDRAULIC BRAKE AND PLURAL-ACTUATING MEANS THEREFOR
2 Claims, 3 Drawing Figs.

[52] U.S. Cl. .................................................. 188/106 P,
188/265, 188/325, 188/365
[51] Int. Cl. ....................................................... F16d 65/24
[50] Field of Search ............................................ 188/78, 106
R, 106 P, 265, 325, 345, 365

[56] References Cited
UNITED STATES PATENTS
2,442,057  5/1948  Page ..............................188/152.84 UX
3,194,353  7/1965  Rick ..............................188/78 (.22)
3,236,340  2/1966  Carruth ........................188/152 (.02)

*Primary Examiner*—George E. A. Halvosa
*Attorney*—Charles L. Lovercheck

ABSTRACT: This specification discloses a dynamic hydraulic brake for use in motor vehicles, heavy equipment, and aircraft. The invention consists of a parking brake, antitheft devices and an emergency brake. The invention is carried out by a double action brake master cylinder, a perma-set hydraulic flow valve with locking mechanism, a single action emergency master brake cylinder, two telescoping toggle links, springs, stop block brake shoes and brake drum. An improved suspension for the brake shoes is provided.

Inventor
FRANK G. RICK

By
Charles L. Lovercheck Attorney

HYDRAULIC BRAKE AND PLURAL-ACTUATING MEANS THEREFOR

STATEMENT OF INVENTION

This invention relates to brakes and, more particularly, to brakes suited for use on power driven vehicles.

OBJECTS OF THE INVENTION

It is an object of the invention to provide an all wheel emergency brake.

Another object of the invention is to provide theft deterrent. Vehicle cannot be moved without a specific set key.

Another object of the invention is to provide positive brake control that will not "grab" and having hydraulic pressure in two directions on the brake cylinder. The operator has better control, assuring no brake grab or brake fade due to excessive use.

Another object of the invention is to provide a power brake that requires no "power brake assist."

Another object of the invention is to provide a brake that will utilize the entire brake lining in contact with the brakedrum.

Another object of the invention is to provide a brake that will limit brake fade.

Another object of the invention is to provide a brake that will eliminate the necessity of adjustment on the service brake.

Another object of the invention is to provide a brake that is easy to maintain.

Another object of the invention is to provide an emergency brake that is simple to adjust.

Another object of the invention is to provide a brake adaptable substantially to any motor vehicle and heavy equipment.

DETAILED DESCRIPTION OF THE DRAWINGS

Figures 1, 2:
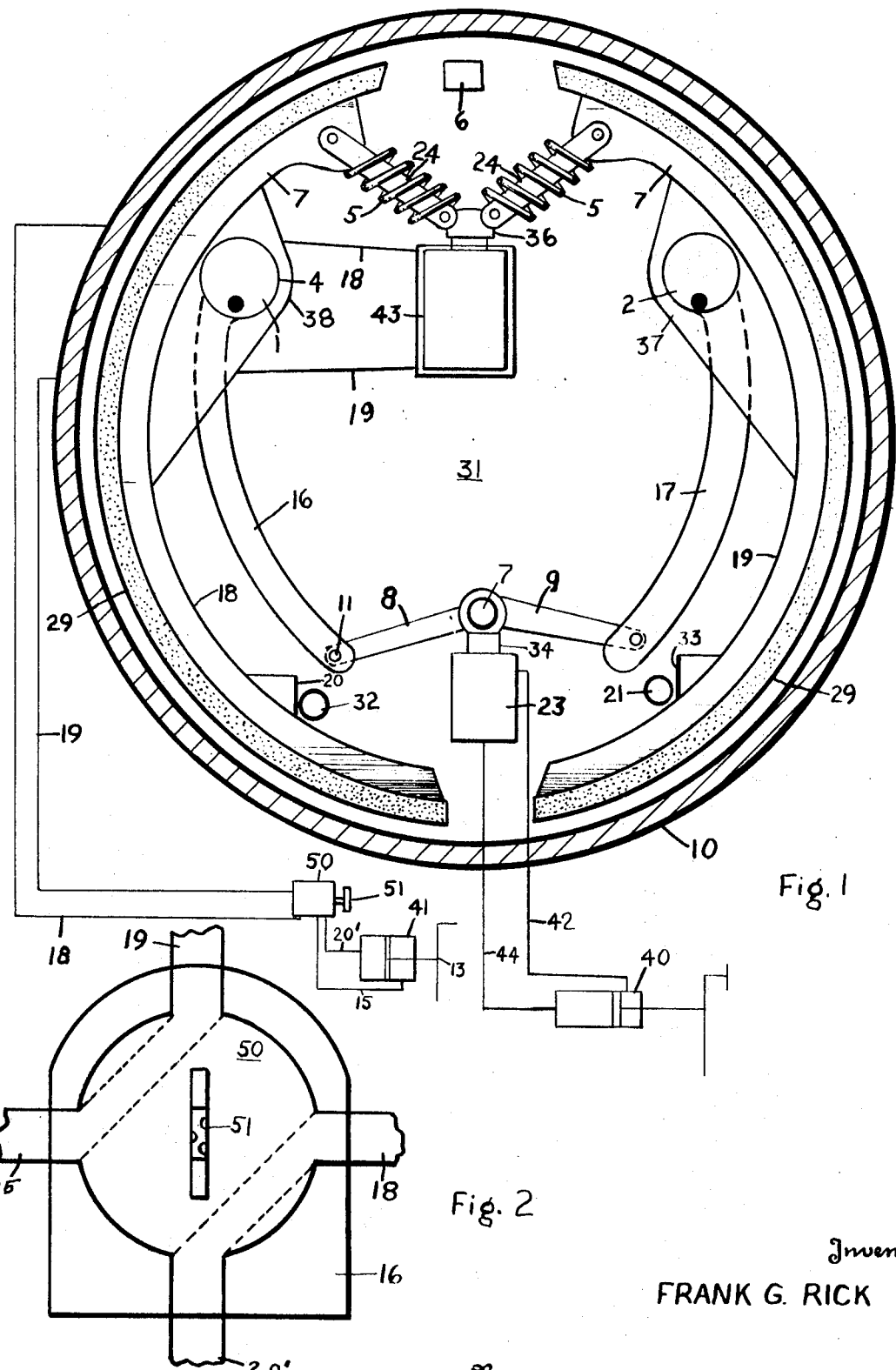
FIG. 1 is a longitudinal cross-sectional view of the brake according to the invention.
FIG. 2 is an enlarged view of the valve.
Figure 3:
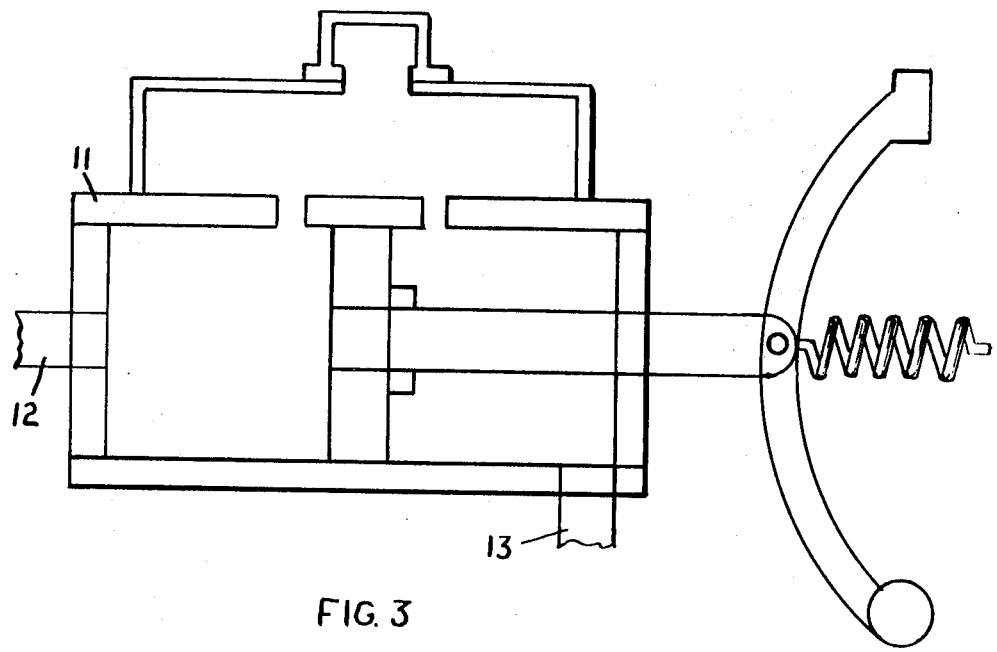
FIG. 3 is an enlarged view of the main cylinder.

Now with more particular reference to the drawings, the brake shown in FIG. 1 has brake drum 10 and brakeshoes 18 and 19 that have suitable linings 29 which engage the inside periphery of the drum 10.

The brakeshoes are supported in the drum and on a vehicle wheel 31 by means of cams 1 and 2. Pins 21 and 32 engage cam surfaces 33 and 20 and guide the brakeshoes along a line parallel to a diameter of the brakedrum and radially outward of the brakedrum. Pins 21 and 32 slidingly engage the cam surfaces 20 and 33. Links 16 and 17 are attached to the cams 1 and 2 which are rotatably received in the brackets 37 and 38 which are fixed to the wheels. The links 8 and 9 are pivoted at 7 to the piston rod 34 of cylinder 23 and the emergency brake control links 24 are pivoted to the piston rod 36 on cylinder 43. The links 24 have two parts which are telescopic relative to each other and the ends of the links 24 opposite the piston rod 36 are attached to the brakeshoes. A stop 6 is fixed to the wheel.

A control mechanism made up of a main master cylinder 40 connected by lines 42 and 44 to the brake cylinder 23 actuates the main brake by forcing the links 8 and 9 toward the opposite side of the brakedrum thereby rotating the cams 1 and 2 and through the cams 1 and 2 applying the brakeshoes to the inside of the drum.

Since the cam surfaces 20 and 33 are slidable on the pins 32 and 21, these cams moving on pins 32 and 21 move the brakeshoes toward the brakedrums and will further increase the force urging the brakeshoes into contact with the drum.

The key actuated valve 50 is connected in series with lines when the key actuated valve 50 is open, the cylinder 41 will drive hydraulic fluid through lines 20' and 19 to the cylinder 43 which through its piston rod 36 will force the links 24 to move into contact with the stop 6, thus the links will be over center in a toggle fashion and the springs 5 will urge the shoes apart from each other.

The valve 50 is shown in greater detail in FIG. 2. The cylinder 50 of the valve is rotated by the key 51 to align the ports in the cylinder with the lines 15 and 20' so that the line 15 is connected to the line 19 and the line 20' is connected to the line 18.

Line 15 is a return line at all times. Line 20' is a pressure line at all times.

When the brake is to be set, the key 51 is turned to lock position which will connect lines 20' and 19 and the master cylinder is depressed. This will allow the hydraulic flow to force piston rod 36 up. Key 51 in valve 50 will also connect lines 18 and 15 to allow hydraulic flow to return to master cylinder 41.

When the brakes are to be released, the key 51 is turned to the release position and connect lines 20' and 18 and depress master cylinder 41. This will force hydraulic flow through line 18 and force piston rod 36 down to release the brakes. Lines 19 and 15 are connected in this position to allow hydraulic flow to return to master cylinder.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A brake comprising a brakedrum,
   a wheel,
   brakeshoes on said wheel adapted to engage said drum,
   a main brake cylinder having a piston rod,
   an emergency brake cylinder having a piston rod,
   a first lever and a second lever,
   cam means connecting said levers to said brakeshoes,
   a first link and a second link, said first and said second link being connected together at a pivot point,
   the other end of said first and said second link being pivoted to said levers,
   said main brake cylinder being fixed to said wheel and having a piston rod connected to said levers at said pivot point,
   a first emergency link and a second emergency link, one end of each said emergency link being connected to the piston rod of said emergency cylinder,
   each said emergency link being connected to a said brakeshoe at an end thereof remote from said first link,
   each said emergency link being made of a first part and a second part, said first part of each said emergency link being telescopically received in said second part of said emergency link,
   and a resilient compression means on each said emergency link urging said emergency links to extend to their full strength,
   a stop on said wheel,
   said emergency links being adapted to be forced into alignment with each other and past center bringing said links into engagement with said stop whereby said brakeshoes are held in engagement with said brakedrum.

2. The brake recited in claim 1 wherein pins are fixed to said wheels and cam surfaces are disposed on said drums,
   said cam surfaces being inclined along a line relatively tangent to said pins and sloping in a direction away from the center of said wheels whereby said cam surfaces carry said brakeshoes toward said drums when said brake main cylinder swings said levers, with said cams connected thereto.